(12) United States Patent
Moore et al.

(10) Patent No.: US 11,899,967 B2
(45) Date of Patent: Feb. 13, 2024

(54) VECTOR PROCESSOR DATA STORAGE

(71) Applicant: Lightmatter, Inc., Boston, MA (US)

(72) Inventors: Nicholas Moore, Boston, MA (US);
Gongyu Wang, Newton, MA (US);
Bradley Dobbie, Medford, MA (US);
Tyler J. Kenney, Boston, MA (US);
Ayon Basumallik, Framingham, MA (US)

(73) Assignee: Lightmatter, Inc., Boston, MA (US)

( * ) Notice: Subject to any disclaimer, the term of this patent is extended or adjusted under 35 U.S.C. 154(b) by 228 days.

(21) Appl. No.: 17/527,107

(22) Filed: Nov. 15, 2021

(65) Prior Publication Data

US 2022/0155996 A1    May 19, 2022

Related U.S. Application Data

(60) Provisional application No. 63/114,373, filed on Nov. 16, 2020.

(51) Int. Cl.
*G06F 3/06* (2006.01)
*G06F 15/80* (2006.01)

(52) U.S. Cl.
CPC .......... *G06F 3/0656* (2013.01); *G06F 3/0613* (2013.01); *G06F 3/0619* (2013.01); *G06F 3/0659* (2013.01); *G06F 3/0673* (2013.01); *G06F 15/8061* (2013.01)

(58) Field of Classification Search
None
See application file for complete search history.

(56) References Cited

U.S. PATENT DOCUMENTS

| | | | |
|---|---|---|---|
| 4,827,407 A | 5/1989 | Nakatani | |
| 5,335,195 A | 8/1994 | Jutand et al. | |
| 2007/0011441 A1* | 1/2007 | Eichenberger | G06F 9/30036 712/221 |

OTHER PUBLICATIONS

International Search Report and Written Opinion dated Feb. 28, 2022 in connection with International Application No. PCT/US2021/059425.
Koza et al., Compressed multirow storage format for sparse matrices on graphics processing units. arXiv:1203.2946v2. Apr. 25, 2014. 26 pages.
Hussain et al., Memory controller for vector processor. Journal of Signal Processing Systems. Nov. 2018;90(11):1533-49.

* cited by examiner

*Primary Examiner* — Scott C Sun
(74) *Attorney, Agent, or Firm* — Wolf, Greenfield & Sacks, P.C.

(57) ABSTRACT

Aspects of the present disclosure provide an aligned storage strategy for stripes within a long vector for a vector processor, such that the extra computation needed to track strides between input stripes and output stripes may be eliminated. As a result, the stripe locations are located in a more predictable memory access pattern such that memory access bandwidth may be improved and the tendency for memory error may be reduced.

20 Claims, 9 Drawing Sheets

VECTOR PROCESSOR DATA STORAGE

CROSS-REFERENCE TO RELATED APPLICATIONS

This application claims the benefit of U.S. Provisional Application Ser. No. 63/114,373, filed on Nov. 16, 2020, and entitled "VECTOR PROCESSOR DATA STORAGE," which is hereby incorporated herein by reference in its entirety.

FIELD OF THE DISCLOSURE

This application is generally related to data storage of input and/or output vectors of a vector processor.

BACKGROUND

A vector processor is a computing device that takes a vector as input, and provides another vector as output. For example, a matrix-vector processor can perform a matrix multiplication of matrix A on an input vector X to generate an output vector Y. A length of a vector refers to the number of individual elements in the vector. Typically, the matrix-vector processing units (digital or analog) are designed to be square, for example with a square matrix A such that the size of the input vector X is equal to the size of the output vector Y. There is, however, no computer architecture limitations that restrict the dimensions of the matrix-vector processing units. Therefore, in general a matrix vector processor can be rectangular with the length of the output vector being different from the length of the input vector.

A vector processor can be used to perform deep learning, machine learning, latent-variable models, neural networks, and other matrix-based differentiable programs to solve a variety of problems, including natural language processing and object recognition in images.

One example of recent advances in fast computer processors relates to deep learning computer chips, which have accelerated the computational runtime by architecting a computer system whose computational units are optimized for the operations within a neural network. For example, the tensor processors within a graphical processing unit (GPU) or the systolic multiply-and-accumulate (MAC) array within a tensor processing unit (TPU) are designed to complete matrix-matrix multiplications with as few clock cycles as possible.

SUMMARY OF THE DISCLOSURE

Some embodiments relate to a device that comprises a vector processor configured to receive as an input one of a first vector and a second vector, and to provide as an output the other one of the first vector and the second vector. The second vector is longer than the first vector. The device further comprises a buffer configured to store the second vector in a plurality of stripes. A first stripe of the plurality of stripes and a second stripe of the plurality of stripes are aligned in the buffer.

Some embodiments relate to a method to store input and output vectors for a vector processor in a buffer. The method comprises receiving, by the vector processor, one of a first vector and a second vector as input to the vector processor; providing, with the vector processor, the other one of the first vector and second vector as output of the vector processor; and storing the second vector in a plurality of stripes, wherein a first stripe of the plurality of stripes and a second stripe of the plurality of stripes are aligned in the buffer. The second vector is longer than the first vector.

Some embodiments relate to a system comprising at least one processor and at least one computer-readable storage medium having stored thereon instructions which, when executed, program the at least one processor to perform a method for storing input and output vectors for a vector processor in a buffer. The method comprising acts of: receiving, by the vector processor, one of a first vector and a second vector as input to the vector processor; providing, with the vector processor, the other one of the first vector and second vector as output of the vector processor; and storing the second vector in a plurality of stripes, wherein a first stripe of the plurality of stripes and a second stripe of the plurality of stripes are aligned in the buffer. The second vector is longer than the first vector.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in all the figures in which they appear. In the drawings.

DETAILED DESCRIPTION

Figure 1:
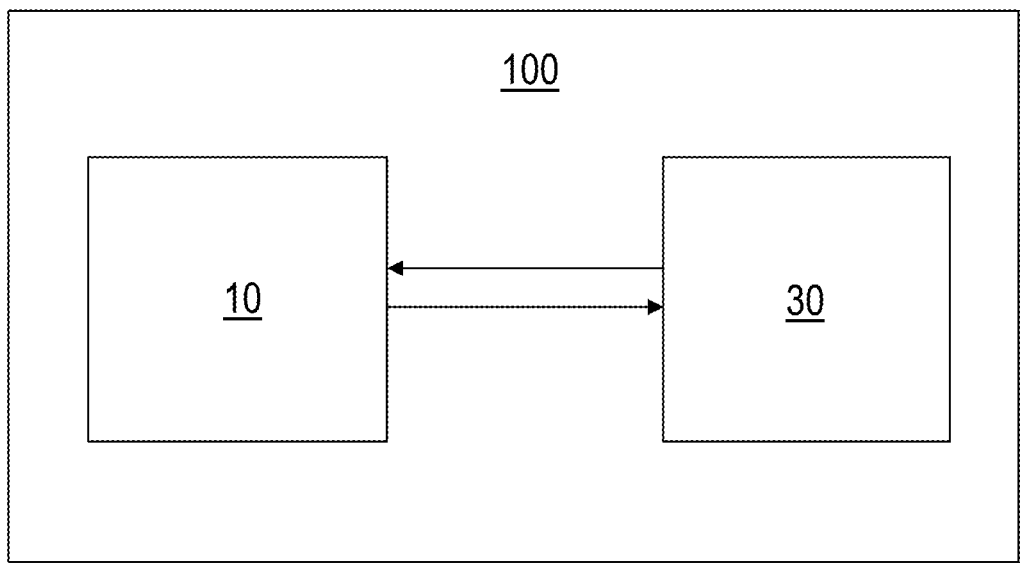
FIG. 1 shows an illustrative computing system 100 in which data storage as described herein may take place, in accordance with some embodiments.

Disclosed herein are improved methods for handling storage of input and output vectors for a vector processor with mismatched sizes in a buffer.

Storage in a buffer may be organized into lines of a fixed size. Elements in a vector may be divided into multiple stripes for storage. For example, a vector may consist of multiple stripes. One way to store a vector having multiple stripes is to place a next stripe continually after a previous stripe, such that the start of the next stripe immediately follows the end of the previous stripe. This arrangement may be referred to as "unaligned" because when the stripe size is different from the size of a line, the start positions for the stripes are no longer aligned with each other. The inventors have appreciated and recognized that unaligned storage requires extra computation to track the changing distances between stripes (such as strides between the input and output stripes) in an input vector and an output vector during runtime, which could improve memory access bandwidth when processing a long tensor having long vector sizes. Furthermore, memory error may occur when the unaligned stripe start positions is not tracked correctly.

Aspects of the present disclosure provide an aligned storage strategy for stripes within a long vector for a vector processor, such that the extra computation needed to track strides between input stripes and output stripes may be eliminated. As a result, the stripe locations are located in a more predictable memory access pattern such that memory access bandwidth may be improved and the tendency for memory error may be reduced.

Some embodiments are directed to storing an output vector that is longer than a corresponding input vector, although aspects of the present disclosure equally apply to storing an input vector that is longer than an output vector. Therefore it should be appreciated that where examples herein describe storing an output vector that is longer than an input vector in a buffer, the same disclosure applies equally to storing an input vector that is longer than an output vector in the buffer.

In some embodiments, stripes for an output vector start in aligned positions, such as each starting at the beginning of a line within the buffer. In some embodiments, stripes for the output vector are stored in an interleaved fashion.

Some embodiments are directed to a division of the available buffer space into multiple sections, for example K sections where K is an integer. The division may be a substantially even division such that each section has an equal size. In some embodiments, stripes in an output vector are allocated into different sections on different parts of the buffer. In one example, the buffer is divided into two halves, a first stripe in an output vector is allocated into the first half before the half-way point of the buffer, and a second stripe in the output vector is allocated into the second half after the half-way point of the buffer.

In some embodiments, stripes in the output vector are stored in an interleaved fashion, where a second stripe is interleaved with a first stripe using new lines from the lines of the first stripe, such that it is not necessary for the buffer to have line numbers that are an integer power of 2.

The aspects and embodiments described above, as well as additional aspects and embodiments, are described further below. These aspects and/or embodiments may be used individually, all together, or in any combination of two or more, as the application is not limited in this respect.

FIG. 1 shows an illustrative computing system 100 in which data storage as described herein may take place, in accordance with some embodiments. Computing system 100 includes a processor 10 and a memory 30. Processor 10 may include a vector processor configured to receive an input vector and provide an output vector based on the input vector, such as but not limited to a matrix multiplication with the input vector. Memory 30 may comprise one or more memory units of any suitable hardware implementation, and may be external or internal to the processor 10 as embodiments of the present disclosure are not so limited. Memory 30 may include a buffer. Processor 10 may read from and write to the buffer data including input and output vectors.

In FIG. 1, the processor 10 may further includes one or more processing units. Memory 20 may include a non-transitory computer-readable storage medium such as a volatile and/or non-volatile memory. Memory 30 may store one or more instructions to program the one or more processing units in processor 10 to perform any of the methods or functions described herein.

Figure 2:
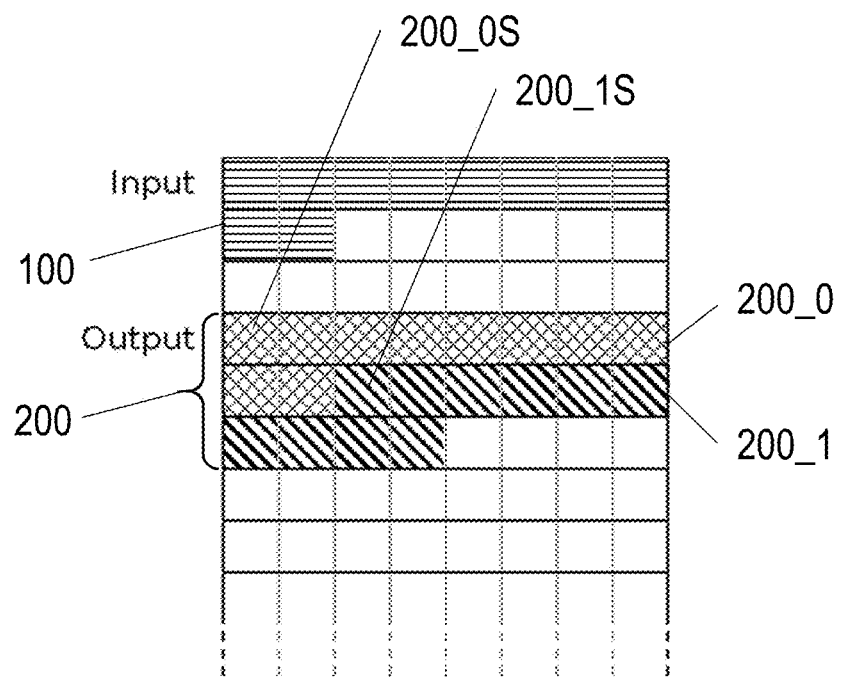
FIG. 2 shows a schematic diagram of an exemplary data placement in a buffer when the output vector is twice longer than the input vector.

FIG. 2 shows a schematic diagram of an exemplary data placement in a buffer when the output vector is twice longer than the input vector. FIG. 2 illustrates an example in which a matrix-vector processor takes an input vector 100 of length N and outputs an output vector 200 of length 2N. In FIG. 2, input vector 100 is depicted as one stripe having a length of 10 elements, where the buffer storage is divided into lines of 8 elements for each line. An element may correspond to any suitable size for an element within a vector of the vector processor.

In some embodiments, data processed by a vector processor may be organized as vectors or tensors of more than one dimension, and the data placement as shown in FIG. 2 may represent storage of such a tensor along one dimension, while for each element of a vector in FIG. 2, there may be associated extending into 2 or more orthogonal dimensions. In some embodiments, the elements in a vector such as input vector 100 may represent a single "stripe" or "stripe row," where the vector buffer length is the same size as the input vector. Although it is not necessary that a vector buffer length equals the size of the input vector.

Sometimes, when the input or output of the vector processor is larger than the length of the vector buffer, a vector may be divided into multiple stripes for operation by the vector processor. Additionally, if a matrix in a matrix-vector processor is larger than the length of the vector buffer, multiple stripes may be required to store the matrix. Depending on the matrix size, one or more buffer lines may be used to store a stripe, for example when the size of a stripe is not known until runtime. Because this dimension of stripes can be arbitrarily sized, there is no need to use multiple stripes to store a matrix with an arbitrary size in the dimension of the vector stripes.

Referring back to FIG. 2, output vector 200 is twice as long as input vector 100, and consists of two stripes 200_0, 200_1. As shown in FIG. 2, the start 200_1S of the second stripe 200_1 immediately follows the end of the first stripe 200_0. While the start 200_0S of the first stripe 200_0 is aligned with the first element of a line on the left side of the diagram in FIG. 2, the start 200_1S of the second stripe 200_1 is located at a third element on a line, which is not aligned with the start of the first stripe 200_0. While allocating the second stripe immediately after the end of the first stripe is simple and has a high storage utilization, there is a problem in that the distance (or stride) between the start positions of an input stripe and an output stripe changes during runtime and this parameter must be tracked throughout the runtime, which undesirably lead to high processor workload and high tendency for memory errors.

Figure 3:
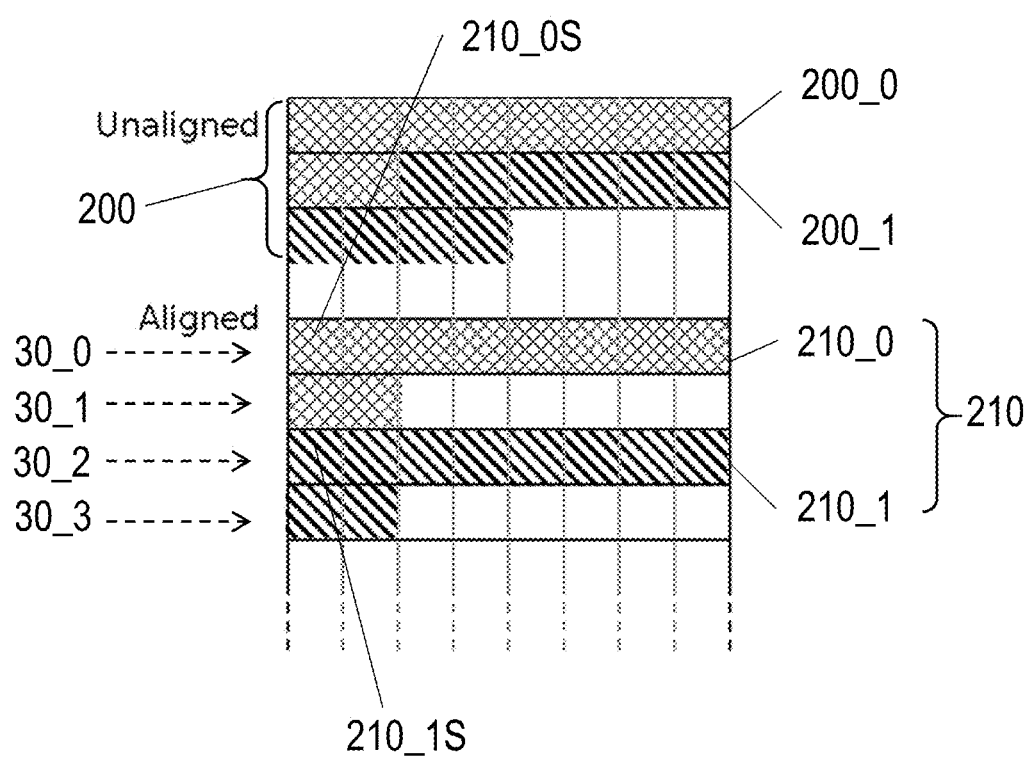
FIG. 3 shows a schematic diagram illustrating an exemplary aligned output data placement in a buffer in accordance with some embodiments, in comparison with an unaligned data placement.

FIG. 3 shows a schematic diagram illustrating an exemplary aligned output data placement in a buffer in accordance with some embodiments, in comparison with an unaligned data placement.

In FIG. 3, output vector 210 has two stripes 210_0 and 210_1. The start 210_0S for the first stripe 210_0 is at the first element of line 30_0, and the start 210_1S for the second stripe 210_1 is at the first element of line 30_2, which is aligned with start 210_0S. As the length of each stripe is not an integer multiple of the length of each line in the buffer, the stripe 210_0 spans line 30_0 and a portion of the next line 30_1 in the buffer, while the stripe 210_1 spans line 30_2 and a portion of the next line 30_3. Because the start positions for both stripes in output vector 210 are aligned at a first element of a line, the distance between each output stripe 210_0, 210_1 with the start of the input stripe 100 as shown in FIG. 2 will be multiples of the size of each line and may no longer need to be tracked during runtime by a parameter.

Figure 4:
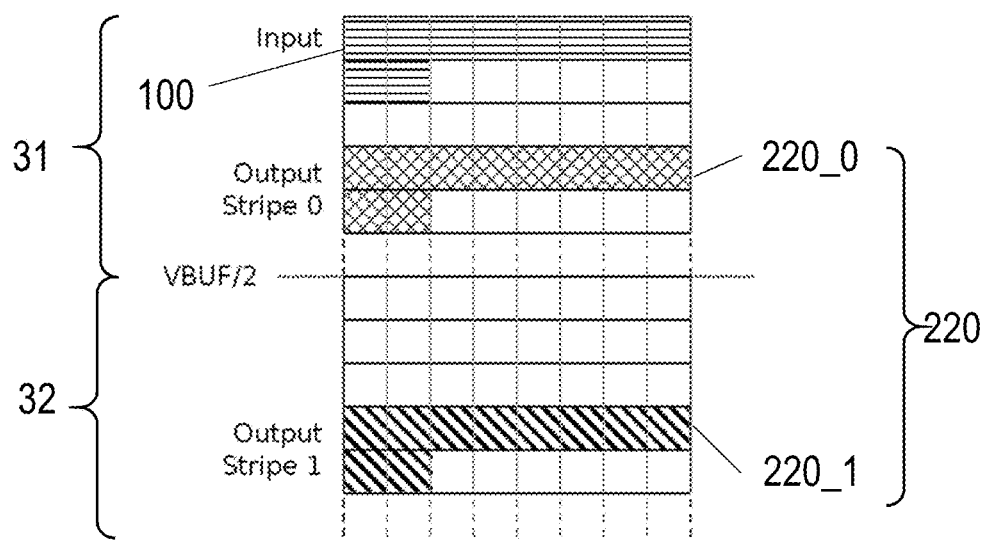
FIG. 4 shows a schematic diagram illustrating an alternative storage strategy by allocating the output stripes into two sections, in accordance with some embodiments.

In some situations, however, the inventors have recognized and appreciated that if the output vector is placed right after the input vector, the distance between the input and output stripes may still be a runtime parameter using the aligned storage strategy. FIG. 4 shows a schematic diagram illustrating an alternative storage strategy by allocating the output stripes into two sections, in accordance with some embodiments.

In FIG. 4, the total available buffer storage size VBUF is first divided into two equal sections 31, 32 around the half-buffer point VBUF/2. The second stripe 220_1 for output vector 220 is written into the second section 32 of the buffer, while the first stripe 220_0 is written into the first section 31. As a result, the first stripe and the second stripe for the output vector are allocated similarly with the same alignment of their respective start positions, but on different sections of the buffer. It should be appreciated that while the example in FIG. 4 divides the buffer into 2 sections, generally the allocation method may be expanded to using a division into K sections, where K is an integer, and to storage of a vector having more than two stripes.

Figure 5:
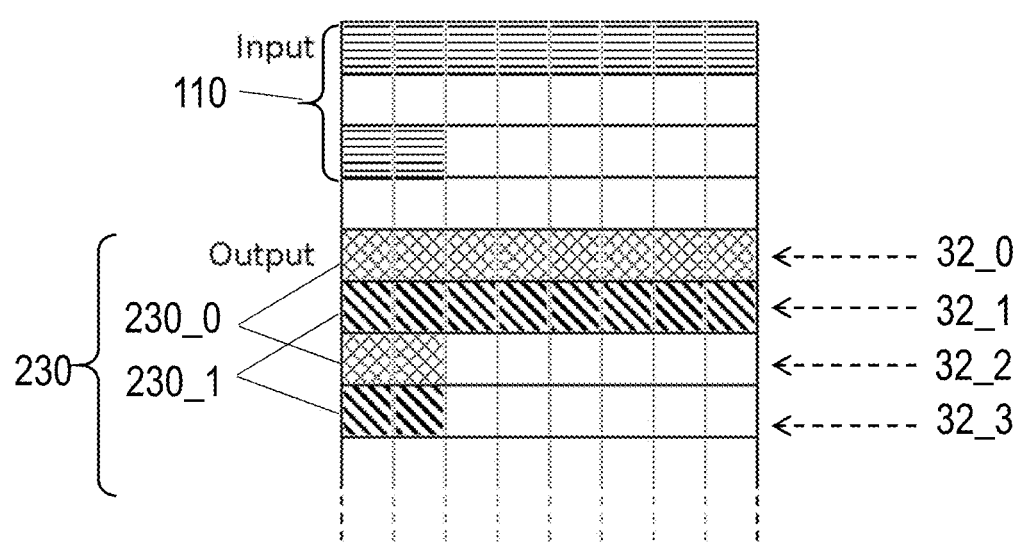
FIG. 5 shows a schematic diagram illustrating an allocation strategy with interleaved and aligned output stripes in accordance with some embodiments that can work with buffer line numbers or division numbers K that is not an integer power of 2.

When either the number of divisions K or the number of lines in the buffer space VBUF is not an integer power of 2, it may be difficult to implement a [number of buffer lines]/2 or generally [number of buffer lines]/K allocation strategy. FIG. 5 shows a schematic diagram illustrating an allocation strategy with interleaved and aligned output stripes in accordance with some embodiments that can work with buffer line numbers or division numbers K that is not an integer power of 2.

FIG. 5 shows that for output vector 230 having two stripes, the second stripe 230_1 is interleaved with the first output stripe 230_0 using new lines. In particular, after the first stripe 230_0 occupies a first line 32_0, the immediate second line 32_1 is written with the beginning of the second stripe 230_1. The next line 32_2 is written with the remainder of the first stripe 230_0, and the line further under 32_3 is written with the remainder of the second stripe 230_1. It should be appreciated that the example shown in FIG. 5 may be generalized to a plurality of output stripes without needing to know the overall number of buffer lines available.

Table 1 outlines two exemplary placements of the output stripes each having a length of 3 lines, in a buffer with a total of 64K lines, in accordance with some embodiments.

TABLE 1

Starting line numbers for the interleaved
and aligned stripe placement strategy
vs. the starting line numbers for the buffer/2 strategy.

| | Starting line number | |
|---|---|---|
| Stripe | Interleaved | Buffer/2 |
| 0 | 0 | 0 |
| 1 | 1 | 32768 |
| 2 | 6 | 3 |
| 3 | 7 | 32771 |
| 4 | 12 | 6 |
| 5 | 13 | 32774 |
| 6 | 18 | 9 |
| 7 | 19 | 32777 |
| 8 | 24 | 12 |
| 9 | 25 | 32780 |

FIGS. 6A-6D show schematic diagrams of four exemplary vector storage allocations that can be used in a ResNet-50 neural network process, in accordance with some embodiments. The examples use the [number of buffer lines]/2 or VBUF/2 placement approach for output stripes. In FIGS. 6A-6D, different hash pattern is used to indicate data from a same image data, while numbers on used to denote stripes within an image. The exemplary ResNet-50 neural network process may be performed using one or more vector processors in a hybrid analog-digital computing system. Some aspects of a hybrid analog-digital computing system are described in U.S. patent application Ser. No. 17/359,025, filed on Jun. 25, 2021 and entitled "FAST PREDICTION PROCESSOR," the disclosure of which is hereby incorporated by reference in its entirety.

Figure 6A:
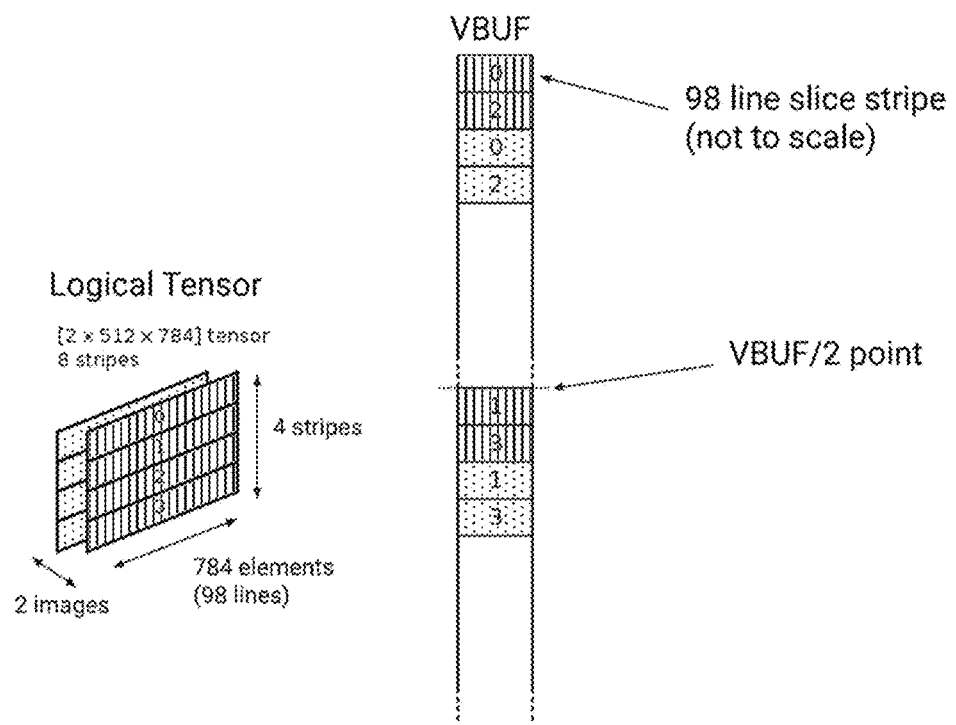
FIGS. 6A-6D show schematic diagrams of four exemplary vector storage allocations that can be used in a ResNet-50 neural network process, in accordance with some embodiments.

FIG. 6A shows a 2×512×784 logical tensor having 2 images, each image is divided into 4 stripes of 98 lines each, where each line in the buffer can store 8 elements of data. Stripe 0 is stored in the first section of the buffer, stripe 1 is stored in the second section of the buffer starting at the VBUF/2 point, and the rest of the stripes are allocated alternatingly in the two sections.

Figure 6B:
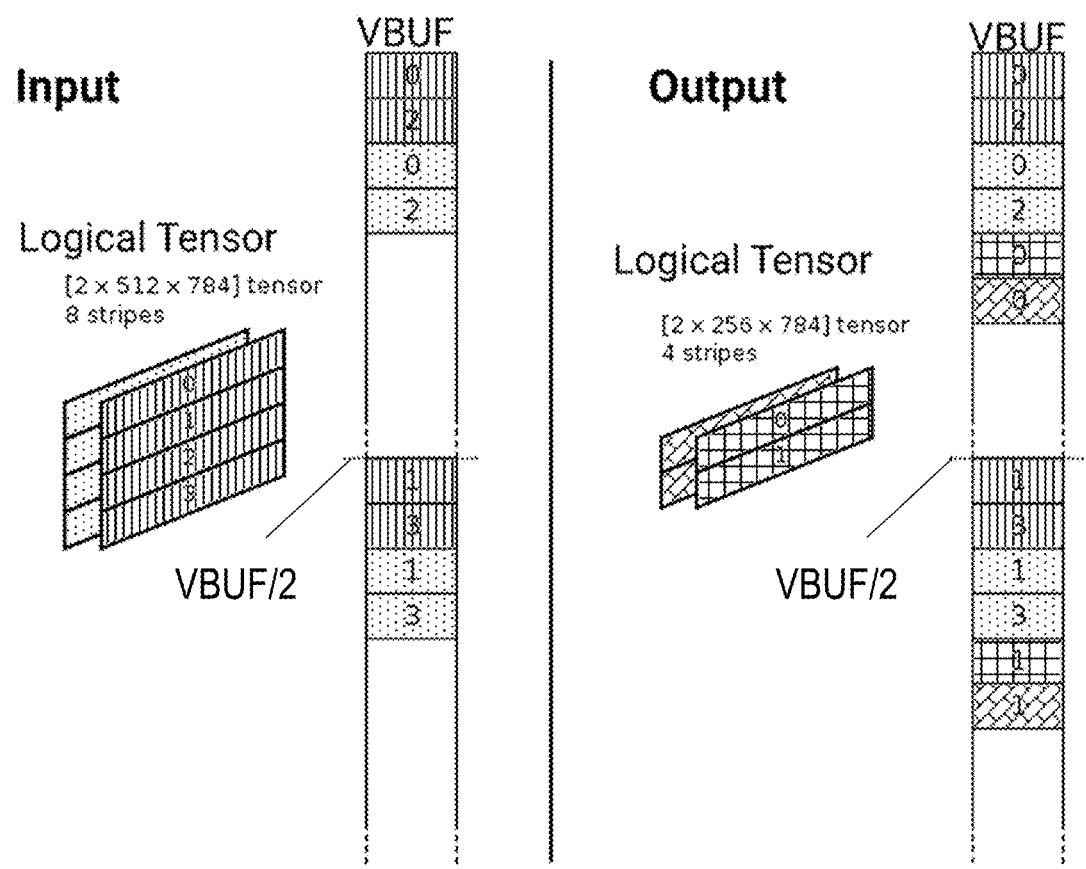

FIG. 6B shows a 2×512×784 logical tensor having 2 images as input, and a 2×256×784 tensor as output. The output tensor is divided into 4 stripes of 98 lines each, and are written into the two sections of the buffer above and below the VBUF/2 point alternatingly.

Figure 6C:
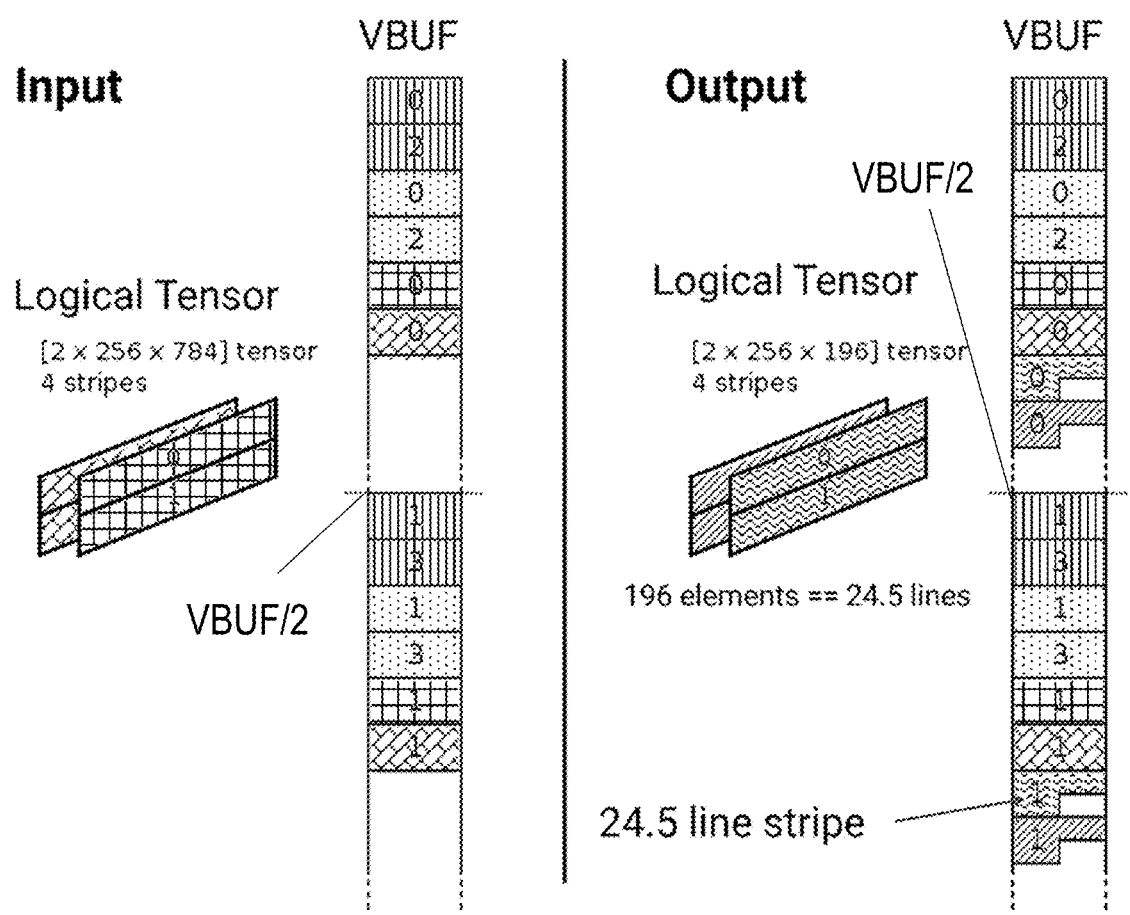

FIG. 6C shows a 2×256×784 logical tensor having 2 images as input having 4 stripes, and a 2×256×196 tensor as output having 4 stripes. In the output tensor, because the vector length of 196 is not divisible by 8, each of the 4 output stripes has a length of 24.5 lines. The output stripes are written into the two sections of the buffer above and below the VBUF/2 point alternatingly.

Figure 6D:
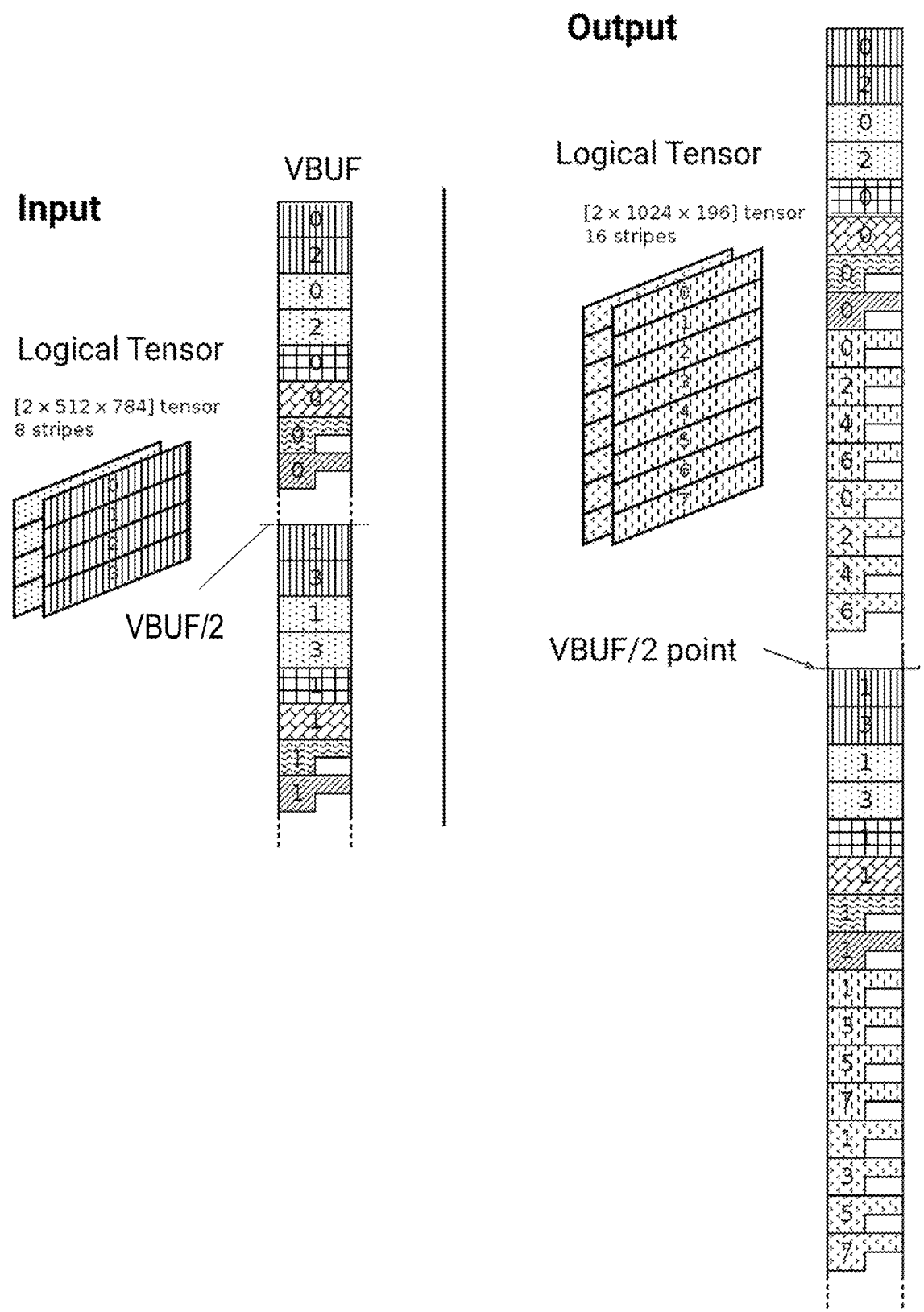

FIG. 6D shows a 2×512×784 logical tensor having 2 images as input having 8 stripes, and a 2×1024×196 tensor as output having 16 stripes. The output stripes are written into the two sections of the buffer above and below the VBUF/2 point alternatingly.

Having thus described several aspects of at least one embodiment of this invention, it is to be appreciated that various alterations, modifications, and improvements will readily occur to those skilled in the art.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A device comprising:
    a vector processor configured to:
        receive as an input one of a first vector and a second vector,
        provide as an output, based at least in part on the input, the other one of the first vector and the second vector wherein the second vector is longer than the first vector and
        split the second vector into a plurality of stripes; and
    one or more computer memory units implementing a buffer comprising a plurality of lines, configured to store the second vector in the plurality of stripes, wherein a first stripe of the plurality of stripes and a second stripe of the plurality of stripes are aligned in the buffer on separate lines of the plurality of lines.

2. The device of claim 1, wherein
    the first vector is the input for the vector processor, and the second vector is the output for the vector processor.

3. The device of claim 1, wherein
the first vector is the output for the vector processor, and the second vector is the input for the vector processor.

4. The device of claim 1, wherein
the first stripe starts on a first line of the plurality of lines, and the second stripe starts on a second line of the plurality of lines that is adjacent the first line.

5. The device of claim 1, wherein
the second stripe is interleaved with the first stripe.

6. The device of claim 1, wherein the buffer is divided into K sections, wherein K is an integer, and
the first stripe and the second stripe are stored in different sections of the K sections.

7. The device of claim 6, wherein K is two, and
the first stripe is located from the second stripe by one half a size of the buffer.

8. The device of claim 6, wherein K is two, the second vector comprises more than two stripes, and wherein
the plurality of stripes are stored in alternating sections of the two sections.

9. The device of claim 1, wherein the buffer is further configured to store the first vector.

10. A method to store input and output vectors for a vector processor in one or more computer memory units implementing a buffer, the method comprising:
receiving, by the vector processor, one of a first vector and a second vector as input to the vector processor;
providing, with the vector processor, the other one of the first vector and second vector as output of the vector processor, wherein the second vector is longer than the first vector;
splitting, with the vector processor, the second vector into a plurality of stripes; and
storing the second vector in the plurality of stripes in the buffer, wherein the buffer comprises a plurality of lines and storing comprises:
aligning a first stripe of the plurality of stripes and a second stripe of the plurality of stripes by storing the first and second stripes on separate lines of the plurality of lines.

11. The method of claim 10, wherein
the first vector is an input vector for the vector processor, and
the second vector is an output vector for the vector processor.

12. The method of claim 10, wherein
the first vector is an output vector for the vector processor, and
the second vector is an input vector for the vector processor.

13. The method of claim 10, wherein
Storing the second vector further comprises:
storing the first stripe starting on a first line of the plurality of lines, and
storing the second stripe starting on a second line of the plurality of lines that is adjacent the first line.

14. The method of claim 10, wherein storing the second vector further comprises:
interleaving the second stripe with the first stripe.

15. The method of claim 10, further comprising:
dividing the buffer into K sections, wherein K is an integer, wherein
storing the second vector comprises storing the first stripe and the second stripe in different sections of the K sections.

16. The method of claim 15, wherein K is two, and storing the second vector further comprises:
spacing the first stripe from the second stripe by one half a size of the buffer.

17. The method of claim 15, wherein K is two, the second vector comprises more than two stripes, and storing the second vector further comprises:
alternatingly storing the plurality of stripes in the two sections.

18. The method of claim 10, further comprising:
storing the first vector in the buffer.

19. A system comprising at least one processor and at least one computer-readable storage medium having stored thereon instructions which, when executed, program the at least one processor to perform a method for storing input and output vectors of a vector processor in one or more computer memory units implementing a buffer, the method comprising acts of:
receiving, by the vector processor, one of a first vector and a second vector as input to the vector processor;
providing, with the vector processor, the other one of the first vector and second vector as output of the vector processor, wherein the second vector is longer than the first vector;
splitting, with the vector processor, the second vector into a plurality of stripes; and
storing the second vector in the plurality of stripes in the buffer, wherein the buffer comprises a plurality of lines and storing comprises:
aligning a first stripe of the plurality of stripes and a second stripe of the plurality of stripes by storing the first and second stripes on separate lines of the buffer.

20. The system of claim 19, wherein the act of storing the second vector further comprises:
interleaving the second stripe with the first stripe.

* * * * *